United States Patent [19]
Gaudette

[11] Patent Number: 5,144,814
[45] Date of Patent: Sep. 8, 1992

[54] THERMISTOR CALIBRATION
[75] Inventor: Marvin Gaudette, Rockton, Ill.
[73] Assignee: Eaton Corporation, Cleveland, Ohio
[21] Appl. No.: 674,988
[22] Filed: Mar. 26, 1991
[51] Int. Cl.[5] .............................................. G01K 15/00
[52] U.S. Cl. ...................................... 62/225; 62/129;
374/3
[58] Field of Search ........................ 62/126, 129, 225;
374/3, 172, 183

[56] References Cited
U.S. PATENT DOCUMENTS

| 3,270,547 | 9/1966 | MacRitchie et al. ................... 374/3 |
| 4,481,596 | 11/1984 | Townzen ............................. 374/172 |
| 4,847,794 | 7/1989 | Hrubes ............................. 374/172 X |

*Primary Examiner*—William E. Wayner
*Attorney, Agent, or Firm*—R. A. Johnston

[57] ABSTRACT

A thermistor is employed for sensing refrigerant temperature in a refrigeration system and an electronic controller continuously measures changes in resistance of the thermistor as an indication of refrigerant temperature for generating a control signal for controlling compressor clutch and condenser for the thermistor is calibrated at installation by flowing constant temperature air over the thermistor, measuring the resistance of the thermistor, comparing the measured value with a standard value and storing the comparison in the microcomputer non-volatile memory or externally such as non-volatile memory, diodes, program PINS, etc. as correction factor for operational use in controlling the system with refrigerant flowing over the thermistor.

2 Claims, 3 Drawing Sheets

THERMISTOR CALIBRATION

BACKGROUND OF THE INVENTION

The present invention relates to thermistors employed for temperature sensing in a control system of the type where periodic measurements are taken of the change in resistance of the thermistor for determining changes in the temperature of the medium to which the thermistor is exposed. In such applications, it has been found convenient to provide a low level of current through the thermistor to provide some heating of the thermistor for reference purposes, and to monitor the change in resistance of the thermistor from the self-heated level which are caused by changes in temperature of the surrounding medium.

Self-heated thermistors have been found to be particularly suitable for measuring changes in temperature in refrigerants circulated within an air conditioning or refrigeration system, such as that employed for cooling the passenger compartment of a motorized vehicle. Such a system is shown and described in U.S. Pat. No. 4,993,231, commonly owned by the Assignee of the present invention. In manufacturing such known control systems for automotive passenger compartment air conditioners, it has been discovered that commercially available thermistors typically have resistance versus temperature properties which deviate significantly from the nominal values thereof provided by the manufacturer of the thermistor. This deviation in resistance versus temperature properties can result in a substantial shift or skewing of the operation or response of the control system in view of the different value of resistance measured for any given temperature. Error in the measured resistance can result in a different response from the controller than is desired where the controller is programmed to respond in accordance with a particular algorithm or value from a look-up table. Where air conditioning systems for vehicles are assembled in mass production, a significant variation in resistance versus temperature properties of the commercially available thermistors can result in a prohibitively wide variation in the response of the air conditioner control system sufficient to render the control system effectively dysfunctional. The above-mentioned problem of employing self-heated thermistors as temperature sensors in vehicle air conditioning systems has been found to be particularly troublesome where the thermistor is disposed to sense refrigerant temperature, and to provide an electrical temperature signal to a microprocessor-based controller for effecting control functions in the system, such as cycling the condenser fan or compressor clutch in systems having a mechanical thermal expansion valve. Where the thermistor temperature signal is employed by a microprocessor based controller to control the operation of an electrically operated thermal expansion valve error in the conversion of the measured resistance to temperature can result in inability to adequately control refrigerant flow to the evaporator.

It has therefore long been desired to find a way or means of compensating for the deviation from nominal value of temperature versus resistance of a thermistor employed for periodic measurement of temperature in a medium to be controlled by a control system receiving a signal from the thermistor. It has been particularly desired to find a technique for compensating for such variation in a thermistor employed for periodic temperature measurements in a refrigeration system.

SUMMARY OF THE INVENTION

The present invention employs a thermistor disposed in a fluid medium to be sensed, such as refrigerant in an air conditioning or refrigeration system where the thermistor is heated by a low level current and changes in the resistance of the thermistor due to changes in temperature in the fluid medium are periodically measured and converted to temperature by known properties for that type of thermistor. The present invention has application particularly in vehicle passenger compartment air conditioning systems, where it is desired to sense the temperature of the refrigerant with a self-heated thermistor, and to employ the measurement of the change in electrical resistance of the thermistor to provide a control signal for controlling system functions such as the compressor clutch, the condenser fan, or an expansion valve.

The present invention utilizes a microprocessor based controller which measure the value of the resistance of the thermistor with a low level of self heat, compares the measured value with a standard or reference value, and with a constant temperature flow of air over the thermistor stores the comparison in the microprocessor, or external means such as non-volatile memory, diodes, program pins, etc. The comparison is then utilized as a correction factor during operation of the control system with the medium to be monitored for temperature in service. The present invention enables the thermistor to be calibrated and the correction factor stored after the thermistor is installed in the system hardware, but before installation in the vehicle and charging with refrigerant. In one described application of the present invention, the thermistor is conveniently located in the high-pressure side or inlet of the thermal expansion valve, and thus may be calibrated in the valve after assembly thereof but before installation of the valve in the vehicle air conditioning system.

DETAILED DESCRIPTION

Figure 1:
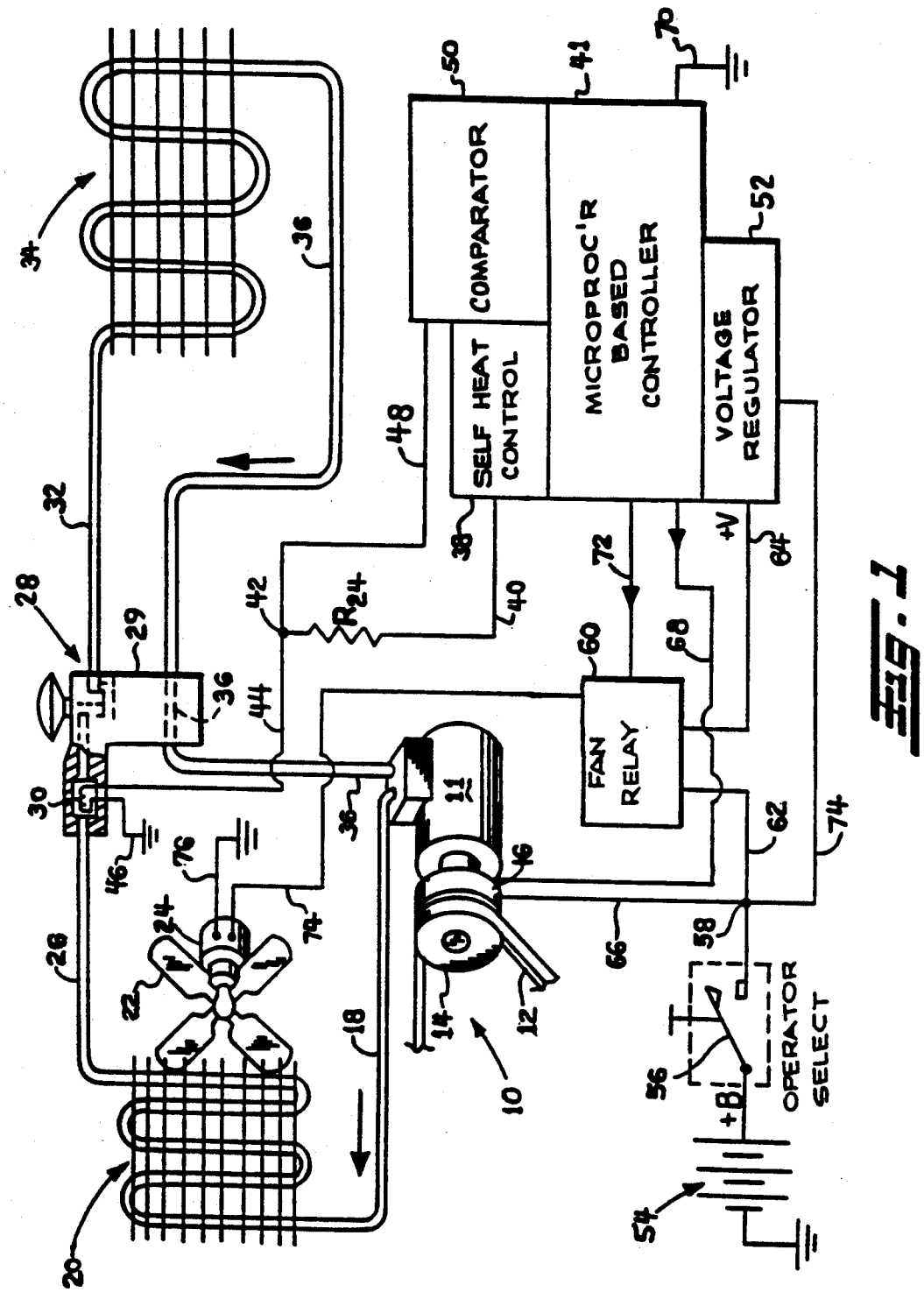
FIG. 1 is a schematic of a refrigeration control system employing a thermistor for sensing refrigerant temperature.

Referring to FIG. 1, a control system for a vehicle air conditioning system is illustrated generally at 10 as having a compressor, indicated at 11, energized by an engine belt 12 driving pulley 14, which operates the compressor through clutch 16. The compressor pumps refrigerant through conduit 18 to a condenser indicated generally at 20 cooled by fan 22, driven by motor 24. Cooled refrigerant from condenser 20 flows through conduit 26, which is connected to the inlet of an expansion valve indicated generally at 28 and having a body or block 29. A thermistor 30 is disposed in an inlet formed in the block 29 of the expansion valve 28, which has its low pressure discharge outlet connected through conduit 32 to an evaporator indicated generally at 34. The outlet of evaporator 34 is connected to discharge through conduit 36, which passes through valve block 29 to the suction return or inlet of compressor 11.

Figure 2:
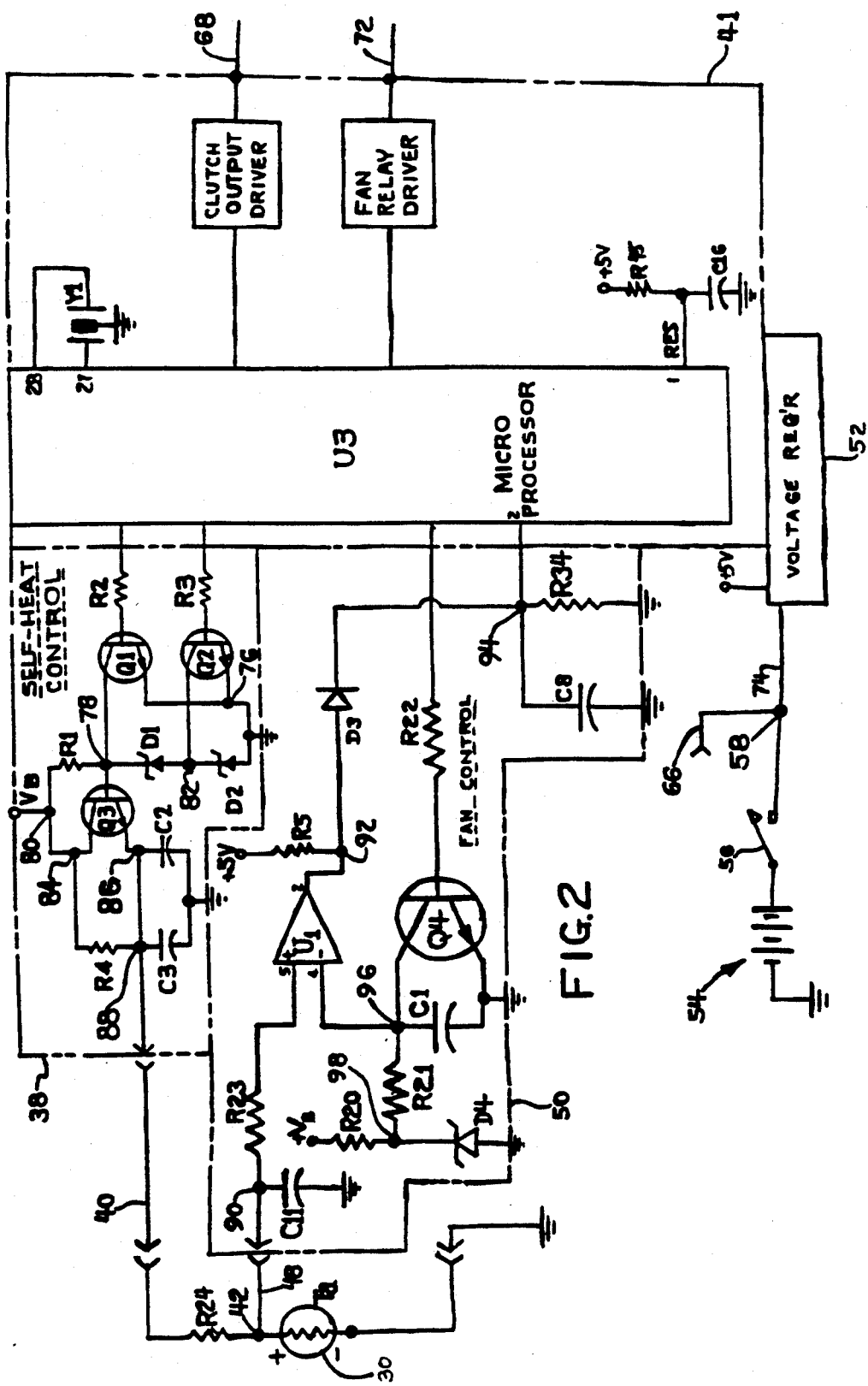
FIG. 2 is a circuit schematic of the thermistor self-heat control.

Referring to FIGS. 1 and 2, the self-heat control circuit 38 is connected along lead 40 through resistor R24 to junction 42 and through lead 44 to thermistor 30, which has the other lead 46 thereof grounded. Junction 42 is also connected through lead 48 to comparator circuit 50. The microprocessor-based controller 41 receives a regulated voltage such as +5.0 volts from voltage regulator 52, which may comprise any suitable source operable upon connection to the vehicle battery 54 through lead 74 and junction 58. Junction 58 through lead 62 to the secondary coil of a fan relay 60. In the present practice, battery 54 has its positive lead connected through operator select switch 56. Lead 64 from regulator 52 connects the primary coil of relay 60 to a source of regulated power; and, the primary coil (not shown) is switched to ground through lead 72 connected to the controller 41.

Clutch 16 also receives power from junction 58 along lead 66; and, through lead 68, the clutch 16 is switched to ground by the controller 40, which is grounded through lead 70. Battery power to the fan motor 24 is provided through lead 74 when the fan relay is energized. Fan motor 24 grounded through lead 76.

Microprocessor U3 receives a timing signal from oscillator Y1 which, in the presently preferred practice, is a ceramic resonator providing a source of timing at a frequency of 4 megahertz. The microprocessor U3 in the present practice comprises a device available from Motorola Semiconductor Products, 2060 Algonquin Road, Schaumburg, Ill. 60195, and has a manufacturer's designation MC68 HC05 TK.

The microprocessor U3 is connected to the low level self heat control through resistor R2 to the base of $Q_1$, which has its emitter grounded through junction 76. The collector of $Q_1$ is connected to junction 78, which is connected to the negative pole of a Zener device D1. Junction 78 receives a voltage from $V_B$, which is typically the battery voltage, through junction 80 and resistor R1. Diode D1 has the positive terminal thereof connected to junction 82, which is also connected to the collector of switch $Q_2$, which has its base connected to the microprocessor U3 through R3 and its emitter also grounded through junction 76. A second Zener device D2 has its negative pole connected to junction 82 and the positive pole thereof grounded.

A third switching device $Q_3$ has its base connected to junction 78 with its collector connected to junction 84, which is also connected to junction 80. Q3 has its emitter connected to junction 86, which is connected to ground through capacitor C2. Junction 84 is also connected through resistor R4 to junction 88, which is also grounded through capacitor C3. Junction 88 is also connected through lead 40 to resistor R24 which is connected through thermistor 30 to ground; and, R24 acts as a current limiter for the thermistor.

The comparator 50 is connected to junction 42 by lead 48, which is also connected to junction 90 which is grounded through capacitor C11. Junction 90 is also connected through R23 to the positive input, pin 5, of comparator device U1, which has its output connected to junction 92, which also is connected through resistor R5 to a 5 volt source from the voltage regulator 52. Junction 92 is connected to the positive pole on diode D3, which has its negative pole connected to junction 94, which is also connected to an input pin 2 of microprocessor U3. Junction 94 is also connected to capacitor C8 and resistor R34 which are both connected to ground.

The negative terminal, pin 4, of U1 is connected to junction 96, which is connected to ground through capacitor C1; and, junction 96 is also connected to the collector of switch $Q_4$, which has its emitter grounded and base connected through resistor R22 to the microprocessor U3. Junction 96 is also connected through resistor R21 to junction 98, which receives a voltage through resistor R20, which is biased at $V_B$; and, junction 98 is also connected to ground through reverse poled Zener device D4.

For calibration, constant temperature air is flowed over the thermistor 30, preferably at 25° Centigrade, and, the thermistor is operated at a low level of self heat as described hereinafter, and after stabilization, the resistance of the thermistor is measured and compared with a known standard or nominal value. The results of the comparison are stored in the microprocessor U3 in a non-volatile memory or external such as non-volatile memory, diodes, program pins, etc. for use as a correction factor during service operation of the control system.

The voltage derived at junction 42 through resistor R24 is applied to capacitor C11 and also through resistor R23 to the positive input of the comparator U1, which forms a part of the comparator block 50 of FIG. 1. Upon generation of a calibration signal to the microprocessor by a suitable test signal generator (not shown), the self-heat control 38 receives a signal from microprocessor U3 which is applied through R3 at the base of $Q_2$, turning $Q_2$ "ON", thereby grounding junction 82 and diode D1. The voltage at junction 78 is lowered to about 5.1 volts, turning $Q_3$ "ON", which applies about 4.9 volts to R24. The voltage at junction 42 is applied through R23 to the positive input, pin 5, of comparator U1. A standard voltage from junction 98 and junction 96 is applied to the collector of $Q_4$ and to the negative input of U1, which is switched "ON" for a period of time proportional to the resistance of $T_a$, which produces an output signal on junction 92, which is applied to the microprocessor U3. The microprocessor compares the measured resistance of $T_a$ with a nominal value from the manufacturer's specification from a look-up table; and, the difference is stored as a correction factor in the non-volatile memory of the microprocessor, or external such as non-volatile memory, diodes, program pins, etc.

Figure 3:
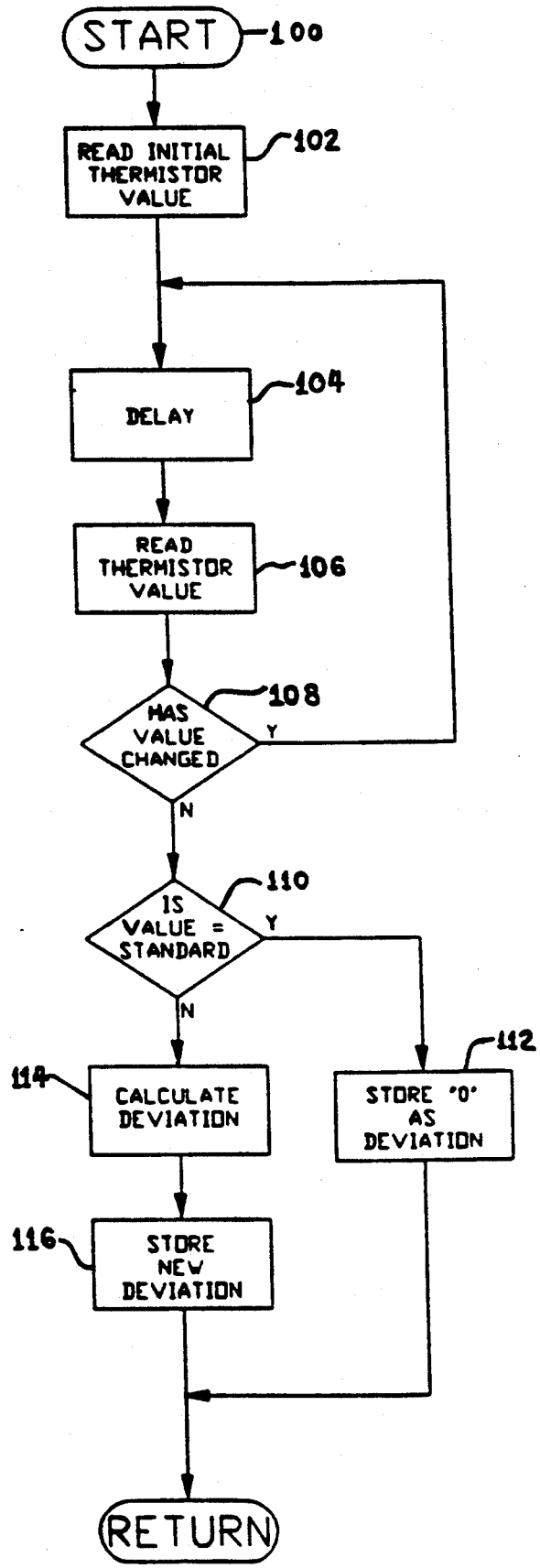
FIG. 3 is a block flow diagram of the calibration procedure employed in the microprocessor-based controller.

Referring to FIG. 3, the microprocessor, upon receipt of a test signal, initiates the calibration at step 100, and reads the initial thermistor value at step 102 with a flow of air at a constant 28° C. over the thermistor. After an appropriate time delay at step 104 (typically one minute) the microprocessor reads the duration of the voltage pulse from U1 at step 106, and determines at step 108 if this value has changed from the previous reading. If the value has changed, as, for example, from start up of the flow of constant temperature air over the thermistor, the microprocessor initiates a repeated delay at step 104 and again reads the thermistor value at step 106. If the value at step 108 has not changed, the value is then compared with the standard value from a look-up table at step 110, and if the value is not different from the standard value, the microcomputer stores a 0 at step 112 as a correction factor or deviation. If, however, the value of the thermistor is different from the standard value at step 110, the difference is determined by the microprocessor at step 114 and the difference or deviation is stored in the non-volatile memory of the microprocessor at step 116.

The values and designations for the various types of circuit components are given in table 1 below.

TABLE I

| Ref. No. | Type | Value/Designation |
|---|---|---|
| R1 | Resistor | 470 Kohm; ¼ Watt |
| R2, R3 | Resistor | 3.3 Kohm |
| R4 | Resistor | 1 Kohm |
| R5, R34 | Resistor | 10 Kohm |
| R20 | Resistor | 100 Kohm |
| R21 | Resistor | 200 Kohm |
| R22 | Resistor | 2.2 Kohm |
| R24T$_a$ | Resistor | 10 Kohm; 2 Watts |
| R45 | Resistor | 33 Kohm |
| C1, C3 | Capacitor | .1 uf |
| C2 | Capacitor | 1.0 uf |
| C8 | Capacitor | .01 uf |
| C11 | Capacitor | .001 uf |
| C16 | Capacitor | .15 uf |
| Y1 | Ceramic Osc. | 4 MHz |
| Q1, Q2, Q4 | Transistor | MMBT 3904 |
| Q$_3$ | Transistor | MJD 31c |
| U1 | Comparator | LM 239 |
| D1 | Zener | MLL 4733, 5.1 v |
| D2 | Zener | MLL 4735, 6.2 v |
| D3 | Diode | MMBD 914 |
| D4 | Zener | MLL 4740, 10 v |

The present invention thus provides a unique and novel way of calibrating a thermistor employed for sensing temperature of a fluid medium flowing over the thermistor. The thermistor in the present application is typically utilized for sensing temperature of liquid refrigerant in a refrigeration system and as it enters the expansion valve. The thermistor may be installed in the valve and calibrated by flowing air held at a constant temperature over the thermistor and determining the resistance thereof by the microprocessor flowing a low level of self-heat current therethrough and determining the resistance. The microprocessor then compares the measured resistance with a standard reference value, and stores the comparison as a correction factor for utilization in operation of the system when refrigerant is flowing therethrough.

Although the invention has hereinabove been described with respect to the illustrated embodiments, it will be understood that the invention is capable of modification and variation, and is limited only by the following claims:

I c;aim:

1. A method of calibrating a temperature sensing thermistor comprising the steps of:
    (a) flowing a stream of constant temperature fluid over said thermistor;
    (b) applying a constant voltage and flowing a current through said thermistor, and permitting the temperature of said thermistor to stabilize;
    (c) measuring the resistance of said thermistor as stabilized with said stream of fluid flowing thereover;
    (d) comparing said stored resistance with a known standard resistance value of said thermistors; and, storing the comparison in a microcomputer;
    (e) flowing variable temperature fluid over said thermistor and measuring the changing resistance thereof with a microcomputer and applying said comparison as a correction factor to said changing resistance.

2. A method of controlling refrigerant flow for a system having a pump circulating refrigerant through a condenser and an evaporator comprising:
    (a) providing an electrically operated valve for controlling flow to the evaporator;
    (b) disposing a thermistor to sense the temperature of flow from the condenser to the valve;
    (c) initially flowing a stream of constant temperature air over said thermistor and allowing the temperature thereof to stabilize and measuring resistance thereof;
    (d) comparing said measured resistance with a known standard value for said thermistor and storing said comparison in a micro-computer;
    (e) installing said valve and thermistor in a refrigerant system and subsequently circulating refrigerant through said system and opening said valve and measuring the varying resistance of said thermistor with refrigerant flowing thereover; and, applying said stored comparison as a factor of correction to said varying resistance and generating an electrical control signal for said valve based on said correction.

* * * * *